June 11, 1957     H. R. HOYT     2,795,235
APPARATUS FOR AUTOMATIC FLOW CONTROL IN CONDUITS
Filed July 13, 1955     4 Sheets-Sheet 1
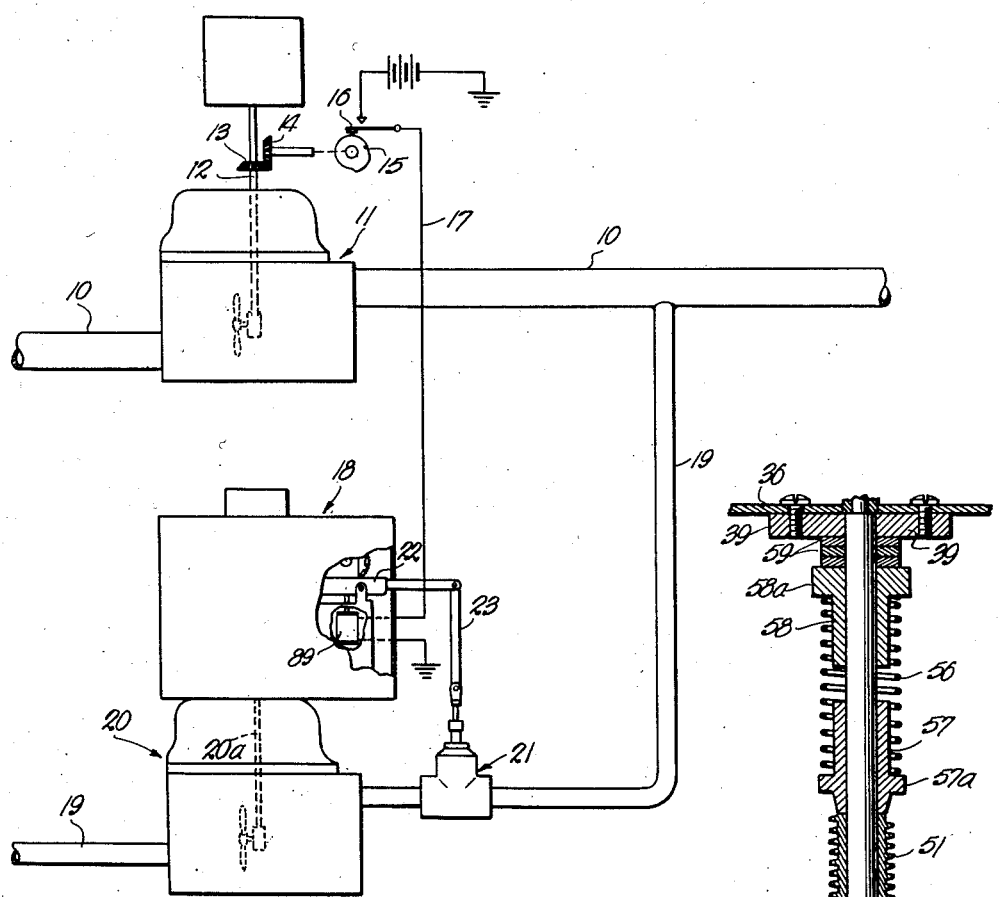
Fig. 1.
Fig. 8.
INVENTOR.
Harold R. Hoyt
BY
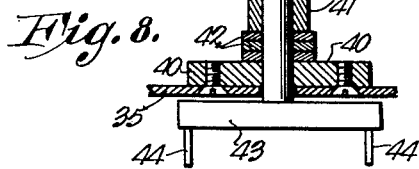
ATTORNEY.

INVENTOR.
Harold R. Hoyt
BY Thos. E. Scofield
ATTORNEY.

June 11, 1957

H. R. HOYT 2,795,235

APPARATUS FOR AUTOMATIC FLOW CONTROL IN CONDUITS

Filed July 13, 1955

INVENTOR.
Harold R. Hoyt
BY
ATTORNEY.

United States Patent Office 2,795,235
Patented June 11, 1957

2,795,235

APPARATUS FOR AUTOMATIC FLOW CONTROL IN CONDUITS

Harold R. Hoyt, Roeland Park, Kans., assignor to Great Lakes Pipe Line Company, Kansas City, Mo., a corporation of Delaware Application July 13, 1955, Serial No. 521,784

7 Claims. (Cl. 137—99)

This invention relates to the feeding or flowing of fluid at controlled rates and refers more particularly to apparatus for automatically maintaining the flow rate in a pipe line at a predetermined and selected value despite variations in pressure in the line and for controlling the flow in that line responsive to conditions external of the line.

An important object of the invention is to provide improved means for continually comparing the rate of flow through a pipe line with a predetermined standard, variable or fixed, the same means being capable of automatically adjusting a flow regulating means in the line to compensate for any variations from the standard due to fluctuations in line pressure or other causes.

One of the primary applications of the invention is in the maintaining of a fixed relationship between the flow rates in two separate conduits despite fluctuations in the flow rate in either or both and despite the lines being separated by a great distance. According to the invention this is accomplished by a flow regulating means in one of the conduits which is adjusted under the control of a comparison mechanism that continuously receives from the two conduits the rates of flow therethrough, the flow from at least one line being electrically transmitted to the comparison mechanism. The comparison mechanism relates the two flow rates to one another and shifts the flow regulating means in the direction necessary to maintain the desired relationship. Fluctuations in the rate of flow in either conduit bring about a compensating adjustment in the flow regulating means.

Another important object of the invention is to provide an improved flow proportioning apparatus wherein feeding of a secondary fluid into a primary fluid is controlled to maintain a fixed proportion between the two fluids, the apparatus being responsive to changes in the flow rates occurring in either line. In the preferred embodiment of the invention, a flow regulating means such as a throttling valve is provided in a secondary line, the valve being set in a neutral position between fully open and fully closed. The valve is operated under the control of a flow rate comparing means which receives from flow rate measuring means in each line the respective flow rates therethrough. The comparison is continuous and if there is any variation in either line the valve is automatically opened or closed the necessary amount to readjust the flow rate in that line to bring it into proper proportion with the flow rate in the first line.

Another object of the invention is to provide apparatus of the character described in which the flow input to the comparison mechanism from at least one line can be transmitted electrically so that while the lines may be separated by considerable distance, proportional flow control can still be obtained. A valuable feature of the invention resides in the provision of this remote control feature.

A further object of the invention is to provide a comparison mechanism and valve actuator which is controlled and operated by the flow rates in two independent flow lines, or by the flow rate in one line and a predetermined condition external of the line.

Still another object of the invention is to provide a comparison mechanism and valve actuator which is capable of adjustment to preselect the desired relationship to be maintained in two separate flow lines.

Yet another object of the invention is to provide flow controlling means which operates to shut off the flow in a second line should the flow for any reason stop in the first line. In this connection a special feature of the flow controlling means resides in the protection afforded against damage thereto in the event of a flow stoppage in the primary line.

Other and further objects of the invention together with the features of novelty appurtenant thereto will appear in the course of the following description.

In the accompanying drawings which form a part of the specification and are to be read in conjunction therewith and in which like reference numerals indicate like parts in the various views;

Fig. 1 is a schematic illustration of a typical system embodying the invention;

Fig. 7 is an enlarged elevation of the escapement mechanism; and

Fig. 8 is an enlarged longitudinal section through the worm gear and drive shaft assembly for the comparison mechanism.

Figure 2:
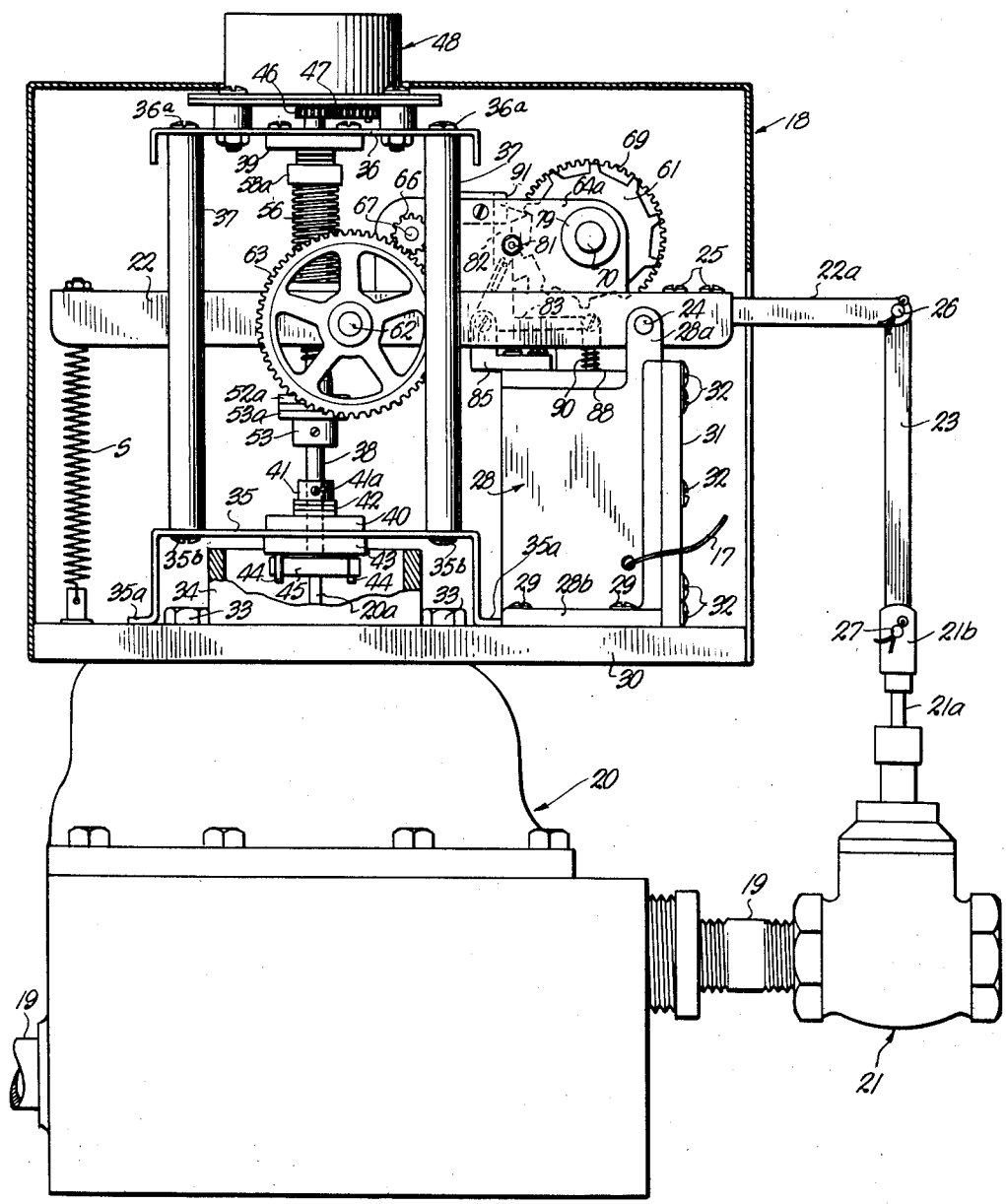
Fig. 2 is a side elevation of the comparison mechanism and valve actuator, showing its relation to the flow meter and valve in the controlled flow line.

Referring to the drawings, reference numeral 10 indicates a flow line through which a primary fluid is being flowed at a given rate. Interposed in flow line 10 is a rotary flow meter 11 of conventional design having a rotary shaft 12 which rotates at a speed dependent on the rate of flow through flow meter 11. A bevel gear 13 is secured to shaft 12 and a second bevel gear 14 meshes therewith to drive a rotary cam 15 through a conventional rotary drive connection which may include a speed reducer (not shown). Cam 15 periodically closes a switch 16 in an electrical circuit 17 which leads to the flow controller assembly generally indicated at 18 and later to be described.

Joining with the primary line 10 is a secondary fluid line 19. Interposed in this line is another rotary flow meter 20 similar to that in line 10. Flow meter 20 has a rotary shaft 20a which transmits the rate of flow in line 19 to the flow controller assembly 18, the latter of which in turn operates, through means hereinafter to be described, a conventional flow regulating or throttling valve 21. Opening or closing of the valve 21 to obtain a higher or lower flow rate through line 19 is governed by the flow controller assembly 18 through a pivotal lever arm 22 and vertical connecting link 23 to raise or lower the valve closure element as the situation may require.

A more detailed showing of the flow controller assembly (with its protective cover broken away or removed) is seen in Figs. 2–7, inclusive.

Lever arm 22, to which reference has already been made, preferably comprises an inverted channel-shaped member pivotally supported for rocking movement about a pin 24 defining a horizontal axis. An extension 22a is secured at one end to the channel by screws 25, the opposite end of the extension providing a yoke in which is pinned by pin 26 the upper end of the upright link 23. Link 23 connects at its lower end with valve stem 21a by a yoke 21b on the latter, pin 27 completing the connection. A helical spring S exerts a continual downward pull on the left hand end (as seen in Fig. 2) of arm 22, thus tending to rotate the arm counter-clockwise about its pivot 24 and raise link 23, but this is normally resisted by engagement of a drive mechanism from flow meter 20 with the arm, as will hereinafter be explained.

The pin 24 on which lever arm 22 is fulcrumed is supported at its ends in spaced upright ears 28a extending upwardly from a rectangular solenoid housing 28. Housing 28 is secured by screws 29 to the top of a rigid base plate 30, the screws passing through the base flange 28b of the housing. An access opening is provided in the end face of housing 28, the opening being covered by a cover plate 31 secured to the upright flanges 28c on opposite sides thereof by screws 32.

The base plate 30 rests upon and is secured to the top of flow meter 20 in any suitable fashion, for example, by bolts 33. It is centrally apertured to receive an upright annular flange 34 formed on top of the flow meter 20 and surrounding the rotary shaft 20a thereof.

Centered over flange 34 and supported on base plate 30 is an arch-like support member 35 which is firmly secured at its ends 35a to the base plate by welding or otherwise. A second support member 36 is spaced well above member 35, being carried thereon by four upright spacer bars 37 screwed to the upper support 36 by screws 36a and to the lower support 35 by screws 35b.

Extending between the upper and lower supports 36 and 35 is the main drive shaft 38 which projects at its upper end through bearing block 39 and at its lower end is received in bearing block 40 (see Fig. 8). Blocks 39 and 40 are secured respectively to upper and lower support plates 36 and 35. A collar 41 is secured in any suitable fashion such as by set screw 41a to shaft 38 above the lower bearing block 40 and washers 42 are slidably interposed between the collar and the block to reduce the friction therebetween.

It will be noted that the lower end of shaft 38 extends downwardly through a suitable aperture in support plate 35 and has secured to its lower end a cross bar 43. Extending downwardly from the opposite ends of cross bar 43 are pins 44. The pins 44 and bar 43 form one part of the coupling means for drivingly connecting shaft 38 to the flow meter shaft 20a, a similar bar 45 having a length greater than the spacing between the pins 44 being secured to the flow meter shaft. It will be evident that as shaft 20a rotates, bar 45 engages pins 44 and causes shaft 38 to turn at the same speed. The shaft 38 extends to above the upper support plate 36, terminating in a spur gear 46 which drives another gear 47 connected with a counter 48 (see Fig. 5) supported on top of and secured to plate 36 by spacers 49 and bolts 50.

Located on shaft 38 intermediate the upper and lower support plates is a worm drive assembly (detailed in Fig. 8) which, as will presently be made clear, serves to translate the rate of flow through pipe line 19 as measured in flow meter 20 into a force tending to constantly rock lever 22 clockwise (as viewed in Fig. 2) and close the valve 21.

Figure 4:
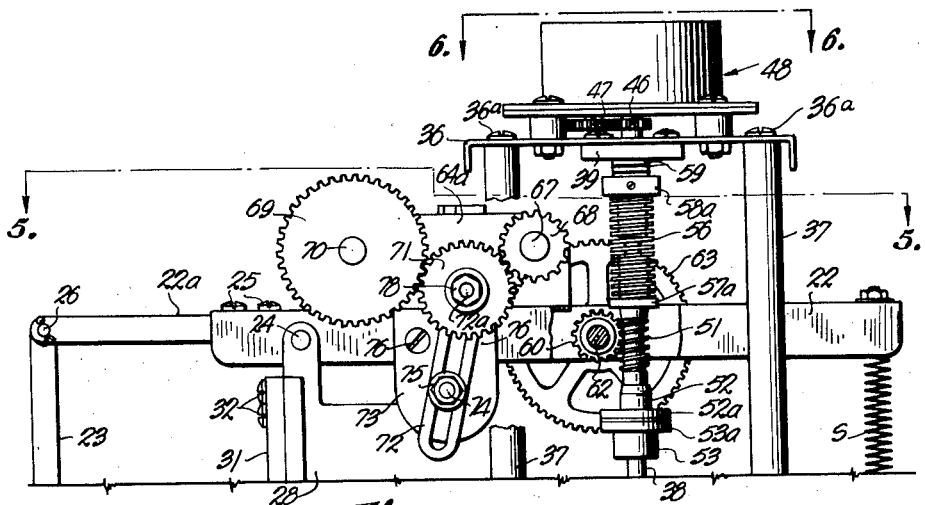
Fig. 4 is an elevational view similar to Fig. 2 but taken from the opposite side of the machine, only the upper part of the mechanism being shown and parts broken away for purposes of illustration.

The details of the worm gear assembly can best be seen in Figs. 2 and 4, which are views taken from opposite sides of the unit, and from Fig. 8. The worm 51 comprises a hollow sleeve which is threaded on its exterior and is of sufficient inside diameter to be freely rotatable on shaft 38. The lower end of the worm 51 is secured to a collar 52 also rotatably mountable on shaft 38 and having a friction drive plate portion 52a. Beneath plate 52a is a complementary friction plate 53a formed on a collar 53. Unlike collar 53, collar 52 is secured to shaft 38, preferably by set screws as at 54. A cork liner 55 is secured to one or the other of the friction plates 52a and 53a to increase the frictional engagement between them.

The upper friction drive plate 52a is biased toward the lower plate by the coil spring 56 encircling the upper portion of shaft 38. A lower spring retainer collar 57a is formed on a sleeve 57 bearing against the upper end of the worm gear 51. An upper retainer collar 58a is formed on another sleeve 58. Collar 58a bears against washers 59 which in turn bear against the upper bearing block 39. The spring 56 exerts enough pressure on plate 52a to firmly compress liner 55 between it and plate 53a and under normal operation the worm 51 will turn with shaft 38 as if it were firmly secured thereto.

Located adjacent the aperture 22a in lever 22 (see Fig. 5) through which drive shaft 38 and the worm drive assembly extend and supported on the lever arm 22 is a worm or pinion gear 60 which forms one end of a gear train terminating at its other end in an escapement wheel 61. Gear 60 is carried by a shaft 62 journalled in the depending sides of lever arm 22, a second and larger gear 63 being located at one end of the shaft to one side of the lever arm.

Figure 3:
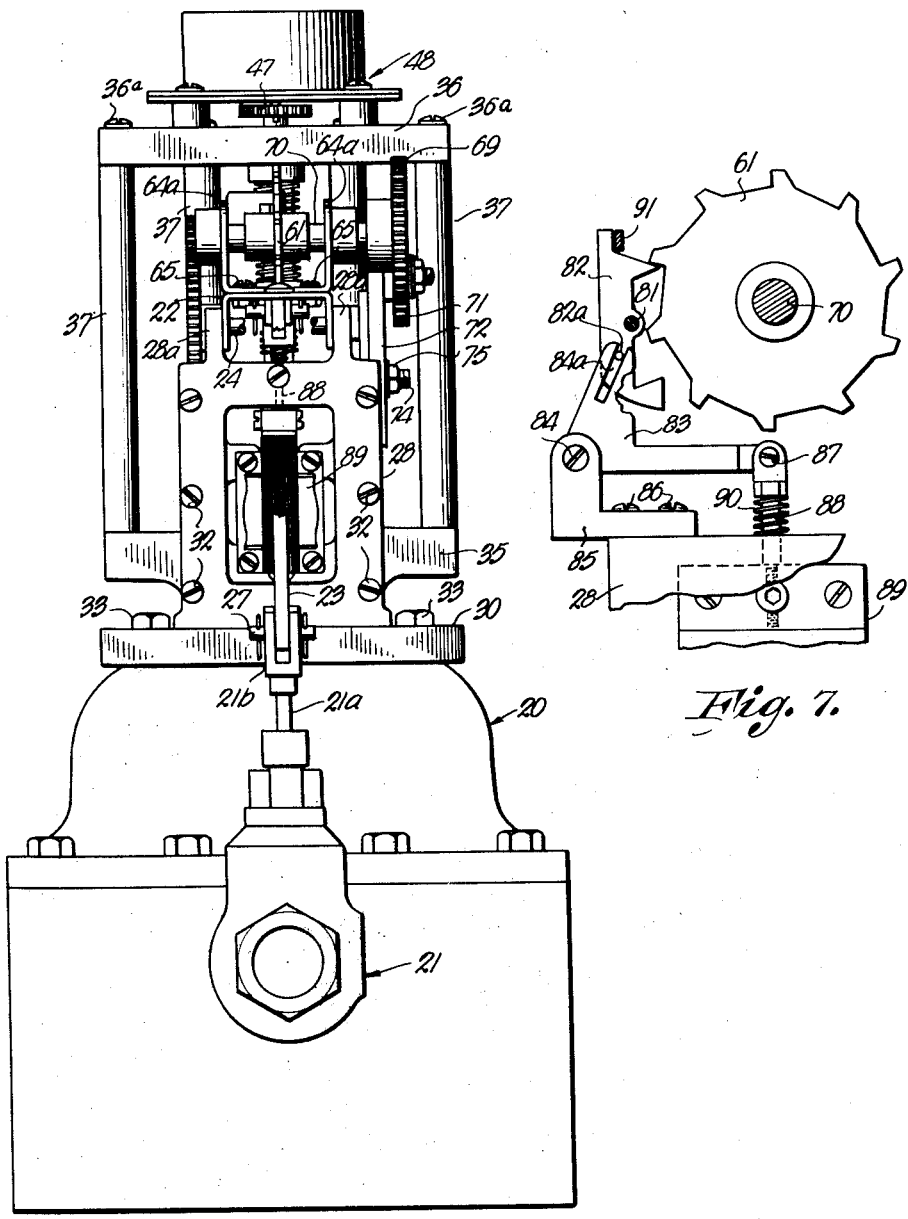
Fig. 3 is an end elevation taken from the right hand side of Fig. 1, the solenoid cover having been removed and parts being broken away for purposes of illustration.

The escapement wheel 61 and the remaining gears and shafts of the gear train are supported in a U-shaped shaft bracket having upstanding sides 64a and secured to the top of lever 22 by bolts 65 (see Fig. 3).

Gear 63, which is driven directly from the worm assembly meshes with a smaller spur gear 66 carried at one end of shaft 67, the other end of shaft 67 having a second gear 68. Meshing with gear 68 and forming the drive connection between gear 68 and gear 69 on the escapement wheel shaft 70 is an idler gear 71. It will be noted that instead of being supported on the shaft bracket, gear 71 is carried at one end of a slotted elongate bracket 72 supported on a vertical plate member 73. A bolt 74 is fixed at one end to the plate 73, the bolt 74 extending through the slot in bracket 72 and a nut 75 being provided for tightening the bracket against the plate. Plate 73 is secured to one side of lever arm 22 by bolts 76, the bolts passing through spacers 77 (see Fig. 5) interposed between the plate and the lever arm to space the plate therefrom. The idler gear 71 is carried by bracket 72 on a stub axle 72a secured thereto, the stub axle terminating in a threaded portion adapted to receive a nut 78.

As hereinbefore noted, idler gear 71 meshes with the gear 68 secured to one end of shaft 70 on which is carried the escapement wheel 61. Collars 79 and 80 (see Fig. 5) serve to anchor shaft 70 against longitudinal movement and the escapement wheel is secured to the shaft centrally between the side walls 64a of the shaft bracket. It will be noted that an elongate aperture 22b is provided in the lever arm 22, the periphery of the wheel extending therethrough.

Figure 5:
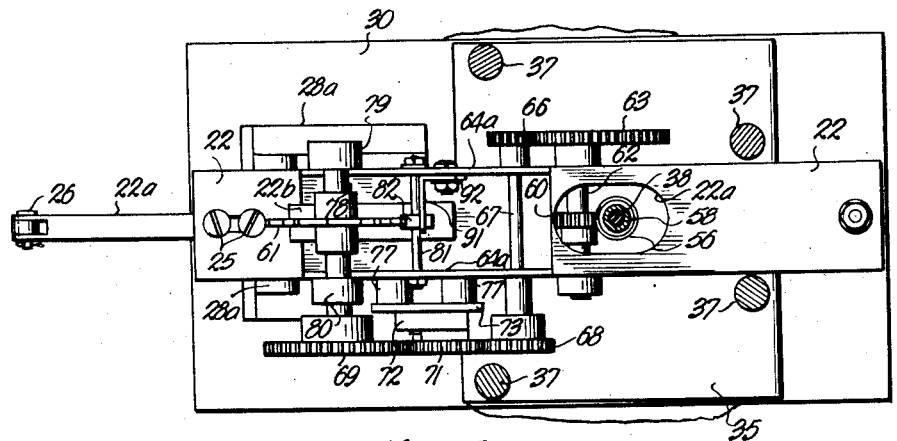
Fig. 5 is a view taken along the line 5—5 of Fig. 4 in the direction of the arrows.
Figure 6:
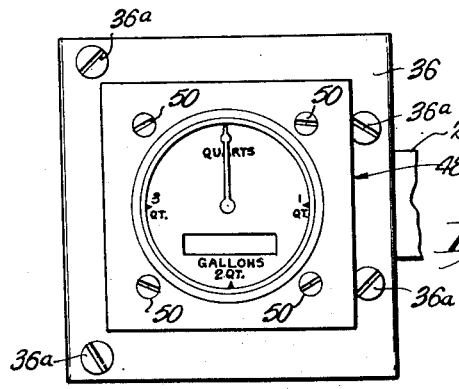
Fig. 6 is an enlarged plan view of the face of the flow counter for the secondary flow line.

Mounted on a cross shaft 81 adjacent the escapement wheel 61 is a double ended pawl 82 having detents at each end for alternately engaging the teeth on the escapement wheel. Pawl 82 is actuated by a rocker arm 83 pivoted at 84 to an L-shaped bracket 85 fixed to the top of housing 28 by screws 86. Rocker arm 84 has formed in one end an inclined cam slot 84a which receives a pin 82a extending from the side of the pawl. The opposite end of the rocker arm is pivotally connected by pin 87 to an upright armature shaft 88 leading from the armature of a conventional solenoid 89 housed within housing 28. (See Figs. 1 and 3.) A coil spring 90 serves to yieldably maintain the rocker arm and pawl in the position shown in Fig. 7, the pawl bearing at its upper arm against the stop arm 91, which limits the clockwise rotation of the pawl. As shown in Fig. 5 stop arm 91 is secured to one wall 64a of the shaft bracket by the bolted connection 92.

As will become more clear in the discussion of the operation of the invention the purpose of pawl 84 and its actuating mechanism, including rocker 83 and solenoid 89, is to provide means for controlling the rate of rotation of the escapement wheel 61 in response to the rate of flow in line 10 (see Fig. 1). The solenoid 89 is connected through circuit 17 with cam 15 which, as has been hereinbefore noted, is rotated at a rate governed by the flow through rotary flow meter 11. For each revolution of cam 15 an impulse is transmitted to solenoid 89 and rocker arm 83 is rocked clockwise and back on its pivot to cause the upper detent on pawl 82 to release the escapement wheel. It should be evident that if there is a force tending continually to turn escapement wheel 61 in a counterclockwise direction as viewed in Fig. 7 then successive rocking movements of pawl 82 under the influence of the solenoid will result in a controlled rotation of the escapement wheel.

*Operation*

The details of construction of the preferred unit having been described, the manner of operation will now be explained.

Ignoring for the moment the flow in line 10 and assuming that pawl 82 is engaged with the teeth of the escapement wheel 61, it will be observed that any flow through line 19 will cause the lever arm 22 to pivot clockwise and rise at the left end against the action of spring S. This is due to the fact that shaft 38 driven by the flow meter shaft 20a causes worm 51 to act against the pinion 60 in the gear train. Since under the conditions assumed the escapement wheel 61 is locked against rotation, thereby preventing any rotation of the pinion 60, the worm 51 serves as a jack tending to impel lever 22 upward. The tilting of the lever arm 22 resulting from the lifting action created by the worm has the result of either partially or fully closing the valve 21, depending on the degree of tilting which takes place.

Taking into account now the flow through line 10, the impulses transmitted from switch 16 to the solenoid 89 serve to cause a controlled rocking of pawl 82 which permits through the escapement wheel and gear train a controlled allowable rate of rotation of the pinion 60. The permissible rotation allowed by the escapement mechanism serves to compensate for the lifting action imposed by the worm 51 when the flow rates in the lines are at the correct proportion. The unit is preferably designed so that when the flow rates are in the correct proportion, the rate of escapement is equal to the input from worm gear 51 and the lever arm 22 is horizontal.

In the event there is an increase or decrease in the flow in line 10, the flow controlling assembly automatically compensates the flow in line 19 to bring it into agreement with the proportion to be maintained between the two lines.

In the case flow increases in line 10 the pawl 82 is rocked at a faster rate thus increasing the permissible rate of rotation of escapement wheel 61 and pinion 60. Since the rate of rotation of worm 51 remains the same (the flow rate in line 19 has not as yet changed) the left end of arm 22 under the influence of spring S will descend. This opens valve 21 further by raising the valve link 23 at the other end and permits a faster flow through line 19. Of course the greater flow rate in line 19 produces an increase in the rate of rotation of the worm 51; and at the point when the flow through line 20 again approaches and equals that necessary to maintain the desired proportion between the lines, the rate of rotation of worm 51 becomes equal to the escapement rate and the arm 22 steadies in the new position and will remain at this position until there is another fluctuation.

In the event of a decrease in the flow rate of line 10 the action of pawl 82 will be slower thus reducing the permissible rate of rotation for pinion 60. Since flow in line 19 is still at the original rate, the worm 51 forces the lever 22 upwardly and valve 21 is closed further to decrease the flow rate in line 20. The movement of the lever continues until the flow rates are balanced at the proper proportion, at which time it stops and occupies the new position where it will remain until another change.

From the foregoing, it should also be evident the changes in the flow rate through line 19 even though there is no change in line 10 will bring the controller into play. In the event the flow rate in line 19 increases due to an increase in line pressure from the normal the flow meter 20 will reflect the increased rate and cause worm 51 to turn faster. Since this attempts to drive the pinion 60 at a rate faster than that permitted by the escapement mechanism the lever 22 will rise at its left end and cause valve 21 to close somewhat. This has the effect of decreasing the rate of rotation of worm 51 and when the valve 21 is closed to a point where the flow rate in line 19 is again at that desired, the arm 22 will set in the new position. Exactly the opposite procedure takes place when the flow rate in line 19 decreases from normal rather than increases. The slower rotation of worm 51 permits arm 22 to be pulled down at its left end by spring S and valve 21 opens to increase the flow until a proper balance is reached.

While each of the conditions that might conceivably arise has been explained above as an isolated occurrence, it should be understood that in operation more than one might occur at the same time. One of the primary advantages of the invention is that the controller compensates for changes in either line whether they happen alone or simultaneously and maintains a constant surveillance over the flow rates in both lines to continuously maintain the desired relationship between the two.

There has also been provided in the invention means for preventing any damage to the flow controller and flow meters in the event of complete halt in the flow through line 10. As hereinbefore noted the drive connection between worm gear 51 and shaft 38 is made through the frictional engagement afforded by plates 52a and 53a. Spring 56 is strong enough to maintain the friction drive unbroken during the normal operation of the unit. However, if for any reason the escapement wheel should become locked or the valve should stick the friction drive permits shaft 38 to keep turning while worm 51 remains stationary. The slip-clutch action prevents any possibility of the jamming of the delicate parts of the mechanism and, therefore, the unit can be left untended for any length of time.

The nature of the invention is such that means are also provided for completely shutting off the flow through 19 should flow in line 10 for any reason cease. This is true whether the flow stops when the switch 16 is open or closed. The teeth arm pawl 82 will engage the teeth on the escapement wheel 61 and lock it against rotation. Since locking of wheel 61 has the effect of locking the pinion 60 engaged by worm gear 51, the result is that any rotation of worm 51 causes lever arm 22 to turn about its pivot in a direction to force the valve link 23 downward and close off flow through line 19.

Adjustment of the flow controller mechanism to handle various proportions between the flow rates in the separate lines can be accomplished by substituting different size idler gears 71 and thus changing the ratio of the gear train. The mounting of the idler gear on the movable bracket 72 makes it possible to insert different size gears in the system without any change in the mechanism as a whole. The radial and longitudinal adjustability possible with bracket 72 allows for accommodation of a wide range of idle gear sizes and thus a single unit can be identified to fit a number of different flow requirements.

It will be understood that while the invention has been described in connection with the proportional mixing of fluids, it is not limited to this use alone. Flow through a single line can be electrically controlled by driving cam 15 from an electric motor or desirable timing mechanism, rather than from another flow line.

From the foregoing it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In flow controlling apparatus for a pipe line flow regulating means in said line operable to increase or decrease the flow therethrough, a pivotal lever arm connected with said regulating means, gear means mounted on said lever arm and movable therewith, flow measuring means in said line, a drive gear driven from said flow measuring means and engaging said gear means on said lever arm, said gear tending to rotate said gear means in one direction, and means independent of the flow in said line for controlling the rate of rotation of said gear means at a desired value whereby any changes in the speed of said drive gear will result in movement of said arm to change said flow regulating means.

2. Apparatus for controlling and maintaining a predetermined proportional rate of flow in two separate fluid conduits despite rate variations in either of said conduits comprising first flow rate measuring means in one of said conduits, a flow regulator in the other of said conduits operable to vary the rate of flow therethrough, second flow rate measuring means in the other of said conduits, a member connected with said flow regulator and movable to increase or decrease the flow through said conduit, gear means mounted on said member, power input means actuated by said second flow measuring means and driving said gear means at a rate corresponding to the rate of flow in said second conduit, and escapement means operated by said second flow measuring means and controlling the movement of said gear means whereby the position of said member at any given time is determined by the rates of flow in said conduits.

3. Apparatus as in claim 2 including electrical means operated by said second flow measuring means and governing said escapement means.

4. Apparatus for maintaining a predetermined rate of flow in a fluid conduit comprising flow regulating means in said conduit operable to vary the rate of flow therethrough and having a neutral position, flow rate measuring means in said conduit, a member connected with said regulating means and movable to shift said regulaitng means from neutral to increase or decrease the flow rate, gear means mounted on said member, power input means connected with and actuated by said flow rate measuring means and driving said gear means at a rate corresponding to the rate of flow in said second conduit, and escapement means operated at a predetermined rate to govern the rate of rotation of said gear means, said escapement being operated at a rate correlated with the predetermined flow rate desired.

5. Apparatus for controlling and maintaining a predetermined proportional rate of flow in two separate fluid conduits despite rate variations in either of said conduits comprising first flow rate measuring means in one of said conduits, a flow regulator in the other of said conduits operable to vary the rate of flow therethrough, second flow rate measuring means in the other of said conduits, a pivotal arm connected with said flow regulating means, a gear train mounted on and carried by said arm and terminating at one end in a drive pinion and at the other in an escapement wheel, means driven by said second flow measuring means and drivingly engaging said pinion to continuously drive same in one direction, and pawl means associated with said escapement and operated by said first flow measuring means to control the rate of rotation of said pinion whereby the position of said arm at any given time is determined by the rates of flow in said conduits.

6. Apparatus as in claim 5 including means whereby the ratio of said gear train can be changed to change the rotational relationship between said pinion and escapement wheel.

7. In flow controlling apparatus for a pipe line, a valve in said line normally set at a neutral position and operable to increase or decrease the flow therethrough, flow measuring means in said line, a support, a pivotal lever arm fulcrumed on said support and operably connected with said valve whereby pivotal movement of said lever arm about the fulcrum operates said valve to increase or decrease flow therethrough depending on the direction of pivotal movement, a rate comparing mechanism mounted on said lever arm and movable therewith, means for transmitting the flow rate in said line from said flow measuring means to said rate comparing mechanism, means operably connecting said last named means with said rate comparing mechanism, and means for transmitting and operably connecting a second rate to said rate comparing mechanism, said rate comparing mechanism and the means for connecting said flow rates thereto being constructed and arranged to cause said lever arm to remain in a neutral position when the flow rate is in a fixed predetermined proportion to said second rate and to cause said lever arm to move in a direction to decrease the flow in said line when the rate in said line increases beyond the proportional rate and to cause said lever to move in a direction to increase the flow through said line when the rate in said line falls below the proportional rate.

References Cited in the file of this patent

UNITED STATES PATENTS

| | | |
|---|---|---|
| 1,926,333 | Fulcher | Sept. 12, 1933 |
| 1,961,350 | Grunsky | June 5, 1934 |
| 2,280,656 | McCoy | Apr. 21, 1942 |
| 2,641,271 | Pressler | June 9, 1953 |
| 2,664,907 | Lowe | Jan. 5, 1954 |